United States Patent
Boneberg et al.

(10) Patent No.: US 6,863,522 B2
(45) Date of Patent: Mar. 8, 2005

(54) METHOD FOR INTRODUCING FUEL AND/OR THERMAL ENERGY INTO A GAS STREAM

(75) Inventors: Stefan Boneberg, Beuren (DE); Thomas Hoeger, Kirchheim (DE); Michael Schonert, Stuttgart (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 330 days.

(21) Appl. No.: 09/986,767

(22) Filed: Nov. 9, 2001

(65) Prior Publication Data

US 2002/0064739 A1 May 30, 2002

(30) Foreign Application Priority Data

Nov. 9, 2000 (DE) .......................................... 100 55 613

(51) Int. Cl.⁷ ................................................ F23J 15/00
(52) U.S. Cl. ............................. 431/5; 431/268; 422/183
(58) Field of Search .......................... 431/5, 7, 11, 353, 431/268; 126/110 C; 236/222; 422/182, 183; 429/13

(56) References Cited

U.S. PATENT DOCUMENTS

| 1,839,879 A | * | 1/1932 | Hyatt ........................ 422/183 |
| 3,662,669 A | * | 5/1972 | Cullinane, Jr. ................ 454/41 |
| 4,040,252 A | * | 8/1977 | Mosier et al. ................. 60/804 |
| 4,421,474 A | * | 12/1983 | Meyer ....................... 431/115 |
| 4,610,622 A | * | 9/1986 | Quinnell ........................ 431/5 |
| 5,401,589 A | * | 3/1995 | Palmer et al. ................. 429/13 |
| 5,826,422 A | * | 10/1998 | Koyama et al. ............. 60/39.12 |
| 5,987,878 A | * | 11/1999 | Koyama et al. ............. 60/39.12 |
| 2002/0064739 A1 | * | 5/2002 | Bonegerg et al. ............... 431/5 |

FOREIGN PATENT DOCUMENTS

| DE | 196 39 150 | | 9/1996 | |
| DE | 197 20 294 | | 5/1997 | |
| DE | 197 27 588 | | 6/1997 | |
| DE | 197 54 013 | | 12/1997 | |
| DE | 197 55 813 | | 12/1997 | |
| DE | 197 55 814 | | 12/1997 | |
| DE | 197 55 815 | | 12/1997 | |
| DE | 197 57 506 | | 12/1997 | |
| DE | 199 02 926 | | 1/1999 | |
| DE | 10055613 A1 | * | 5/2002 | ............. C01B/3/32 |
| EP | 1 020 401 | | 11/2000 | |
| EP | 1209331 A2 | * | 5/2002 | ............. C01B/3/32 |
| GB | 1 460 312 | | 3/1973 | |
| JP | 2001272007 A | * | 10/2001 | ........... F23D/11/40 |

* cited by examiner

Primary Examiner—Henry Bennett
Assistant Examiner—James Barrow
(74) Attorney, Agent, or Firm—Crowell & Moring LLP

(57) ABSTRACT

A method serves the purpose of introducing fuel and/or thermal energy into a gas stream flowing to a catalytic reactor. The gas stream flows in part through an exterior chamber and in part through an interior chamber, which is at least partially open in the flow direction and to which fuel is supplied. The partial streams are re-united after flowing through the two chambers and are fed to the catalytic reactor. In a starting phase of the still cold catalytic reactor, the fuel is burned in the interior chamber. During conventional normal operating modes of the warm catalytic reactor, the fuel is vaporized in the interior chamber. In a suitable device, the exterior chamber and the interior chamber are designed as two tube elements that are inserted into one another.

24 Claims, 4 Drawing Sheets

METHOD FOR INTRODUCING FUEL AND/OR THERMAL ENERGY INTO A GAS STREAM

This application claims the priority of German patent document 100 55 613.2, filed Nov. 9, 2000, the disclosure of which is expressly incorporated by reference herein.

BACKGROUND AND SUMMARY OF INVENTION

The present invention relates to a method for introducing fuel and/or thermal energy into a gas stream flowing to a catalytic reactor. Additionally, the present invention relates to a device for executing the method.

Supplying catalytic reactors with thermal energy (for example, heating catalysts in an exhaust gas branch or catalytic burners in the area of a gas generating system for generating hydrogen-containing gas for a fuel cell system) must occur particularly during the starting phase to achieve an appropriate starting temperature, in particular in mobile application situations, as quickly as possible.

For this, catalytic reactors are generally supplied (1) with thermal energy that is generated for example during combustion or similar processes; and/or (2) with a fuel directly, which can occur both during the starting phase and during normal operation, i.e. with a catalytic reactor that has reached an operating temperature, and which releases thermal energy in the reactor.

The present invention is based on an object of creating a method that enables the supply of fuel and/or thermal energy into a gas stream flowing to the catalytic reactor in a very simple, robust, and space-saving manner with regard to its control and device requirements.

This object is achieved according to preferred embodiments of the present invention.

The method exhibits the particular advantage that the gas stream flowing to the catalytic reactor, for example, (1) air, which flows to a catalytic burner, or (2) exhaust gas of an internal combustion engine, which flows after the starting phase of the internal combustion engine to an exhaust gas catalyst in the form of a heating catalyst and is still cold and contains oxygen, is guided through an external chamber and an internal chamber. The interior chamber is supplied with fuel, which is burned in a starting phase of the still cold catalytic reactor to supply thermal energy to the catalytic reactor through the generated hot exhaust gases. The gas flowing to the catalytic reactor overall would not form an ignitable mixture with a conventional burner design with the appropriately metered quantity of fuel. Due to the fact, however, that a certain quantity of gas flows through the exterior chamber and another partial quantity of the gas flows through the interior chamber, an ignitable mixture can be created in the interior chamber so that a combustion process can take place, without having to reduce the overall amount of gas that is supplied to the catalytic burner at that time during the operation.

Additionally, excessive warming of the exterior chamber is prevented with a relatively cold gas that flows through the area of the exterior chamber and around the interior chamber. A component in which the method takes place can be installed into a system (e.g., a gas generating system for a mobile fuel cell system) without further thermal insulation or similar measures in a very space-saving and inexpensive manner.

During the subsequent course of the method when the catalytic reactor has reached its conventional normal operation and is running at its operating temperature, fuel that may be required for the operation of the catalytic reactor can be vaporized in the interior chamber. The energy required for this process can be derived from the gas stream flowing through the two chambers.

In a particularly favorable embodiment of the present invention, an additional gas stream can be introduced into the area of the exterior chamber, which contains additional fuels. These fuels can then be burned catalytically in the area of the exterior chamber. The generated thermal energy can be used for the vaporization of the fuel that has been introduced into the interior chamber.

An alternative embodiment of the method provides a feature so that the gas stream flowing into the catalytic reactor already carries fuels with it. The gas stream can be, for example, a low-oxygen reformate or educt stream.

The gas stream, as described above, flows through the burner system having an exterior chamber and an interior chamber. Only in the area of the interior chamber is an oxygen-containing medium, which can be air, introduced. In this area, a flame can be ignited due to low flow speed. Due to the stable flame in the interior chamber, a combustion process can be achieved that can take place both superstoichiometrically and substoichiometrically, depending on the requirements.

By mixing the flame with a cold portion of the gas stream that flows through the exterior chamber, an inflow temperature that is compatible for the catalytic reactor is enabled, which is far below the exhaust gas temperature of the open flame. Additionally, by cold gas flowing around the tube element, which can form the interior chamber, the loss of heat in such a device is minimized. Thermal stress from neighboring components (e.g., when used in a gas generating system) is eliminated. Otherwise, the same features that have already been mentioned apply here as well.

An appropriate device for performing the described method has the design of a two-tube burner. The exterior chamber and the interior chamber are formed by two tube elements that are arranged inside one another. As required pursuant to the above method, the tubes are open in the flow direction of the gas, i.e. here on the front ends, so that the gas stream flowing into the device is divided between the two chambers in dependency upon the cross-section of the two tube elements.

In a beneficial embodiment of the device, the area of walls of the interior chamber facing the exterior chamber can be equipped with several components that enlarge the surface, which in a very favorable development additionally contain a catalytic coating.

Thus, when additional fuel is burned catalytically in the area of the exterior chamber, this combustion process occurs directly on the appropriate component, which can have the design, for example, of a fin or rib. The generated thermal energy is released with the appropriate fuel that is supposed to be vaporized via thermal conduction to the walls of the interior chamber and from there through heat transmission to the gas flowing through the interior chamber.

Other objects, advantages and novel features of the present invention will become apparent from the following detailed description of the present invention when considered in conjunction with the accompanying drawings.

DETAILED DESCRIPTION OF THE DRAWINGS

Figure 1:
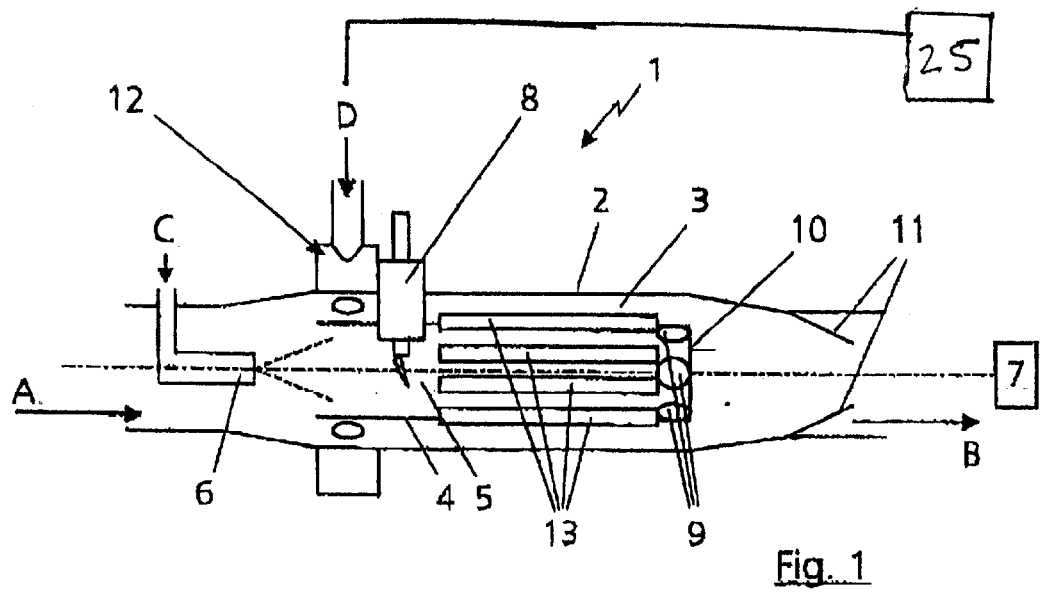
FIG. 1 shows a two-tube burner in a first embodiment according to the present invention.

FIG. 1 shows a set-up of the device for executing a method for introducing thermal energy and/or fuel into a gas stream, in a preferred embodiment as a two-tube burner 1. An outer tube element 2 forms an exterior chamber 3, in which an inner tube element 4 is arranged, which forms an interior chamber 5. The two tube elements 2, 4, respectively, are surrounded in the direction of the flow by inflowing air A and/or the outflowing mixture B of air and exhaust gas and are at least partially open at their respective front ends.

Air A, which in general can be a random gas stream, reaches in part the area of the exterior chamber 3 and in part the area of the interior chamber 5. An atomizer 6 supplies a fuel C, for example methanol, which then reaches the area of the interior chamber 5 in the form of fine particles.

When the device is used as a burner, for example in the starting phase of a catalytic reactor 7, a mixture of methanol and air located in the interior chamber 5 is ignited by an ignition device 8. In the area of the interior chamber 5 a combustion process then takes place, here in particular flame combustion. Exhaust gases are released through recesses 9 (recessed apertures) that constrict the outflow cross-section of the interior chamber 5 in the area of the inner tube element 4 that faces the catalytic reactor 7 in the flow direction and can have an appropriately closed design on its front side 10 to that part of the air current that flows in the exterior chamber 3 and are mixed with it. During the subsequent course of the flow of the mixture B of air and exhaust gas, static mixing elements 11 are arranged so that a considerably warmer, relatively homogeneous mixture B of air and exhaust gas flows through the relatively cold catalytic reactor 7 to heat it up.

The combustion process of the fuel C does not have to take place exclusively in the area of the interior chamber 5. It would also be feasible that burning particles can exit through the recesses 9, which then continue to burn in the area of the exterior chamber 3 that is immediately adjacent to the recesses 9 together with the portion of the air current flowing there.

Combustion of the air and fuel mixture in the interior chamber 5 can be performed very favorably in the two-tube burner 1 because a very large quantity of air A can be directed to the catalytic reactor 7. Practically no controls of the supplied quantity of air A or at least no reduction of the supplied quantity of air A is required while heating the catalytic reactor 7. This is possible because only a portion of the air current reaches the area of the interior chamber 5 and an appropriate mixture, which is ignitable and offers suitable conditions for the desired type of combustion, is created with the metered fuel C.

The two-tube burner 1 will remain relatively cool on its outside since the area of the interior chamber 5, in which the at least nearly largest part of the combustion process takes place, is shielded from surrounding components by the part of the air current A that flows through the exterior chamber 3. Only comparatively little heat loss to the surrounding area takes place. This is favorable with regard to thermal efficiency because comparatively little heat is released to the surroundings as heat loss. The installation of the two-tube burner 1 results in beneficial possibilities, particularly in tight spatial conditions when used in a fuel cell system for a motor vehicle because other components can be arranged in relatively close proximity to the two-tube burner 1 without having to fear heat stress and/or damage.

During further operation of the two-tube burner 1, fuel C is vaporized and supplied to the catalytic reactor 7. For example, the flame is extinguished by briefly shutting off the fuel supply and/or skipping the function of the ignition device 8. After that, fuel C is again injected into the area of the interior chamber 5 via the atomizer 6. Due to the heat that is stored in the walls of the tube element 4, this fuel C evaporates so that the catalytic reactor 7 can be fed a mixture of air and vaporized fuel.

To guarantee the energy supply that is required for the vaporization on a permanent basis, exhaust gas D (e.g., fuel cell waste gas such as from a fuel cell 25, which is comparatively warm and which contains residues of fuel such as hydrogen and methanol residues) can be fed into the area of the exterior chamber 3 via a ring nozzle 12. Appropriate components 13, which enlarge the surface of the outer wall of the interior tube element 4, can direct the heat of the exhaust gas from the area of the exterior chamber 3 to the area of the interior chamber 5 so that the vaporization of the fuel C that is introduced into the area of the interior chamber 5 via the atomizer 6 can continue to occur.

This effect can be further supported if in the area of the components 13 which can be designed, for example as fins, a catalytic coating has been applied so that the fuel particles contained in the exhaust gas D can be burned catalytically. The thermal energy serves to vaporize the fuel in the area of the interior chamber 5. The vaporized fuel C will then reach the area of the recesses 9 in the gas stream flowing through the exterior chamber 3. Behind static mixing elements 11, which can also be foregone depending on the design of the two-tube burner 1, a comparatively homogeneous mixture B of air, exhaust gas and vaporized fuel can flow to the catalytic reactor 7.

In a beneficial embodiment of the present invention, it is possible to arrange a metal fiber fleece or a similar device within the interior chamber 5. The metal fiber fleece can be soldered into the interior chamber 5 for example. With such an installation, the quantity of fuel that can be vaporized can be increased.

Additional embodiments pursuant to FIG. 2 through FIG. 7 of the two-tube burner 1 show alternative designs, in particular of the inner tube 4. The basic operation however always corresponds to that shown in FIG. 1, wherein the components described in FIG. 1, such as the ring nozzle 12, the components 13 etc. can also be incorporated there, but have not been depicted for simplicity.

Figure 2:
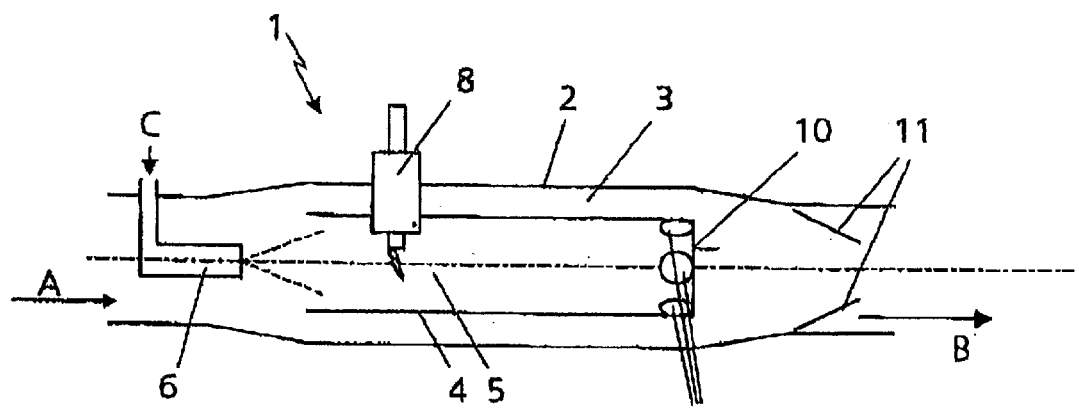
FIG. 2 shows a two-tube burner in a second embodiment embodiment according to the present invention.

FIG. 2 shows a design comparable to FIG. 1, wherein only the components 13 and the ring nozzle 12 were eliminated.

Such a two-tube burner 1 can basically be used as a starting burner. The vaporization of the supplied fuel C occurs through the atomizer 6 with energy carried along by the air stream A, which can result for example in the warming based on compression or similar.

Basically it is also feasible to install the burner for the purpose of heating a heating catalyst in the area of an exhaust gas system of an internal combustion engine. The heating catalyst then represents the catalytic reactor, which is only indicated in principle in FIG. 1. In this situation, however, it would only be useful to feed thermal energy to the catalytic reactor 7 because the vaporization of fuel C could be eliminated in this case.

Figure 3:
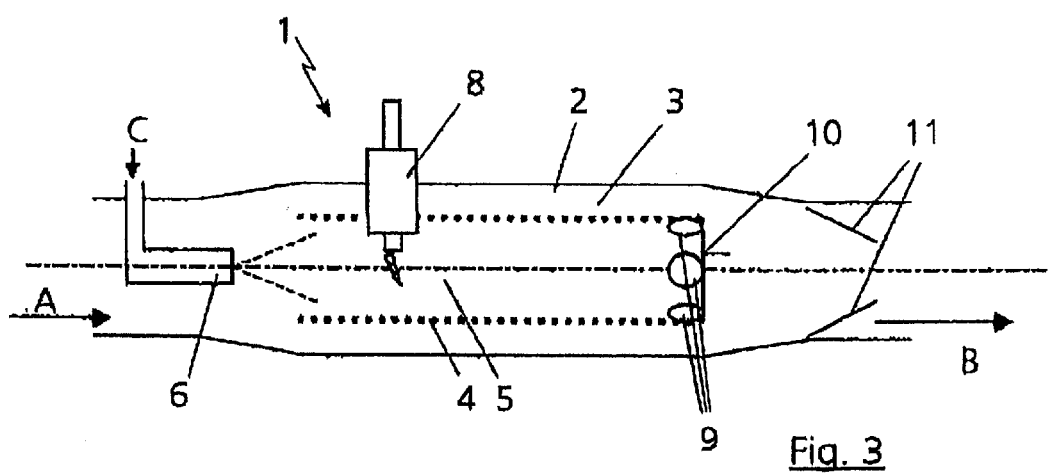
FIG. 3 shows a two-tube burner in a third embodiment embodiment according to the present invention.

FIG. 3 shows another embodiment of the two-tube burner 1, wherein the inner tube element 4 consists of porous material. This enables a faster mixing of the exhaust gases of the combustion process in the area of the interior chamber 5 with the air flowing in the exterior chamber 3. Additionally, to improve the heating effect and/or to introduce thermal energy, a catalytic coating of the porous material of the inner tube element 4 may be useful.

Figure 4:
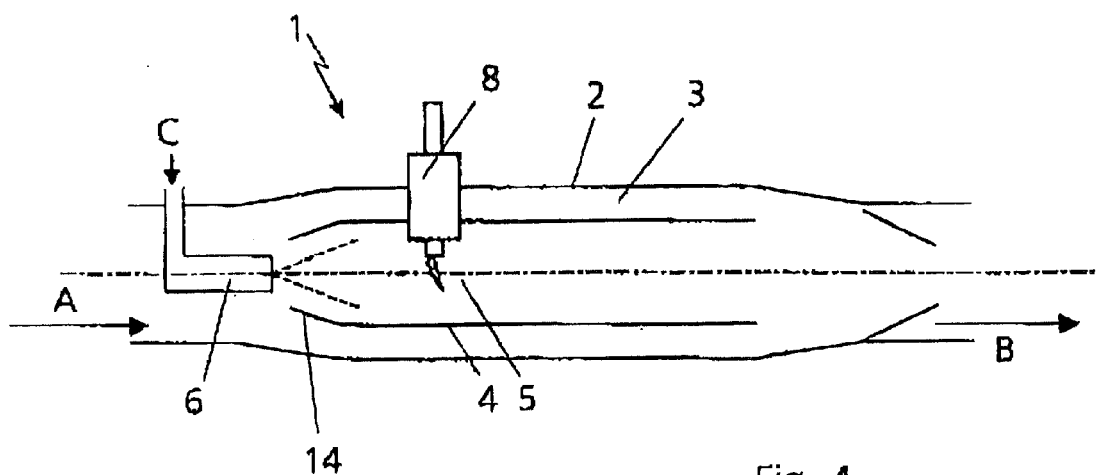
FIG. 4 shows a two-tube burner in a fourth embodiment embodiment according to the present invention.

FIG. 4 shows another embodiment, which has a cross-sectional contraction 14 in the area where the gas stream flows into the interior chamber 5. As already mentioned above, the quantity of air entering the area of the interior chamber 5 together with the metered quantity of fuel C that is fed through the atomizer 6 makes it possible to ensure that an ignitable and/or combustible mixture forms in the interior chamber 5. With the cross-sectional contraction 14 shown here, the quantity of air entering the area of the interior chamber 5 can be influenced appropriately in comparison to the quantity of air flowing in the exterior chamber 3. Alternatively, it would also be feasible to incorporate a cross-sectional expansion instead of the depicted cross-sectional contraction 14.

Figure 5:
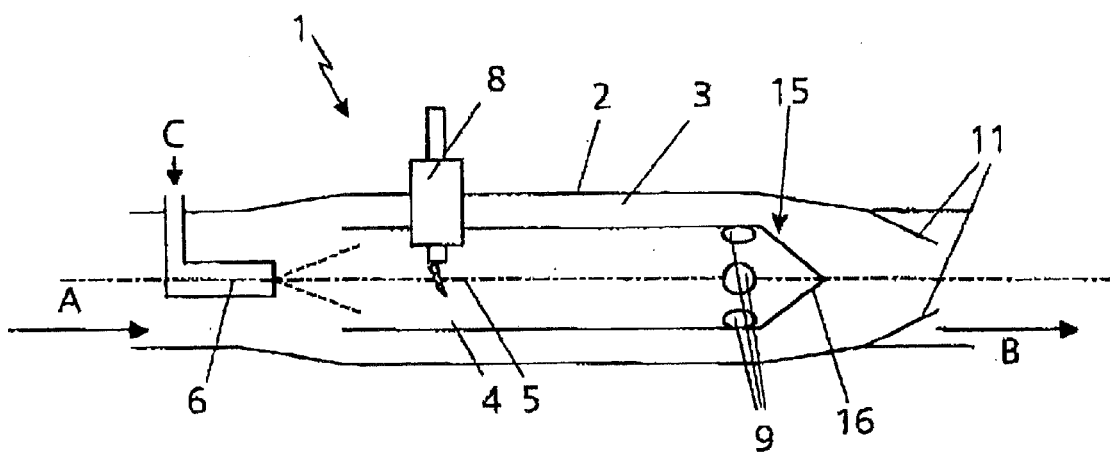
FIG. 5 shows a two-tube burner in a fifth embodiment embodiment according to the present invention.

FIG. 5 represents a variation of the end area 15 of the inner tube element 4. This end area 15 is the end area of the inner tube 4 that faces the catalytic reactor 7. Apart from the recesses 9, which were already disclosed in FIG. 1 through FIG. 3 and which basically also affect a cross-sectional contraction and enhance the mixing of the gases flowing through them due to an increased stream pressure loss, the end area 15 of the inner tube 4 may be designed as a cone 16. Cone 16 enables a favorable stream guidance of the gases flowing through the exterior chamber 3 so that in the end area 15 or in the flow direction immediately after the end area 15 vortex build-up is reduced and thus overall less stream pressure is lost in the two-tube burner 1.

Figure 6:
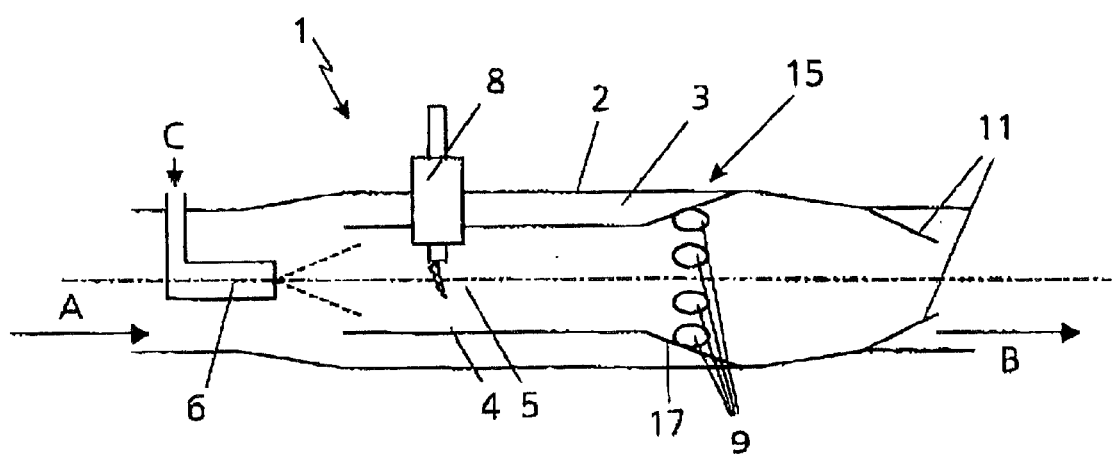
FIG. 6 shows a two-tube burner in a sixth embodiment embodiment according to the present invention.

FIG. 6 shows another embodiment of the two-tube burner 1 which an expansion 17 of the end area 15 of the inner tube element 4. Depending on the volume percentages of the gas streams flowing through the interior chamber 5 or exterior chamber 3, this can also represent a useful embodiment because the gases exiting the area of the exterior chamber 3 flow through the appropriate recesses 9 into the end area 15 of the inner tube 4 in the area of the expansion 17 and then continue to flow through the open front of the inner tube element 4 in a pre-mixed state. Depending on the stream conditions in the two-tube burner 1, this may allow an appropriately thorough pre-mixing of the partial volume streams already after a very brief flow distance.

Figure 7:
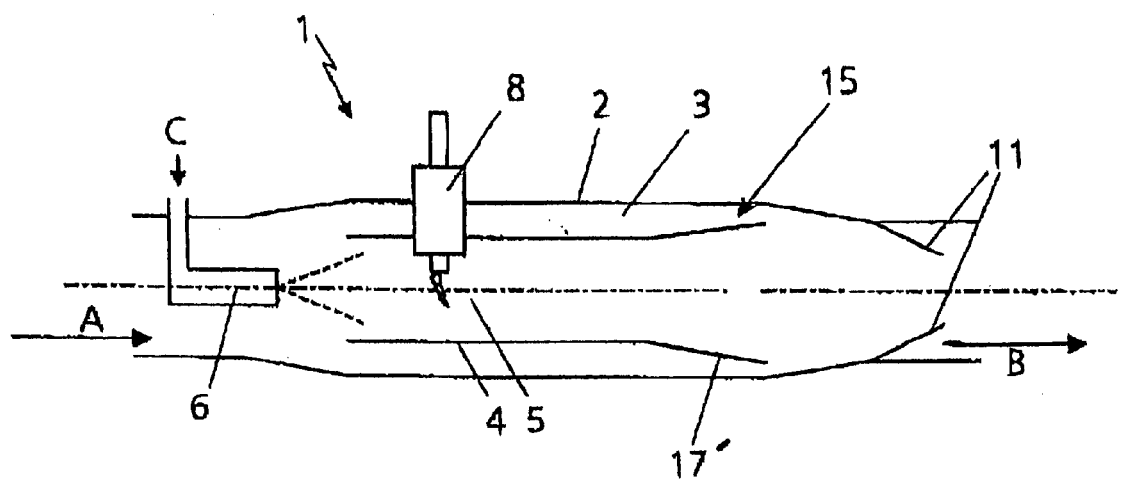
FIG. 7 shows a two-tube burner in a seventh embodiment embodiment according to the present invention.

FIG. 7 depicts an alternative shape of the cross-sectional expansion 17' of the inner tube 4 in its end area 15. This may cause a nozzle effect or similar, which in turn also ensures thorough mixing of the partial volume streams already after a very brief flow distance.

Figure 8:
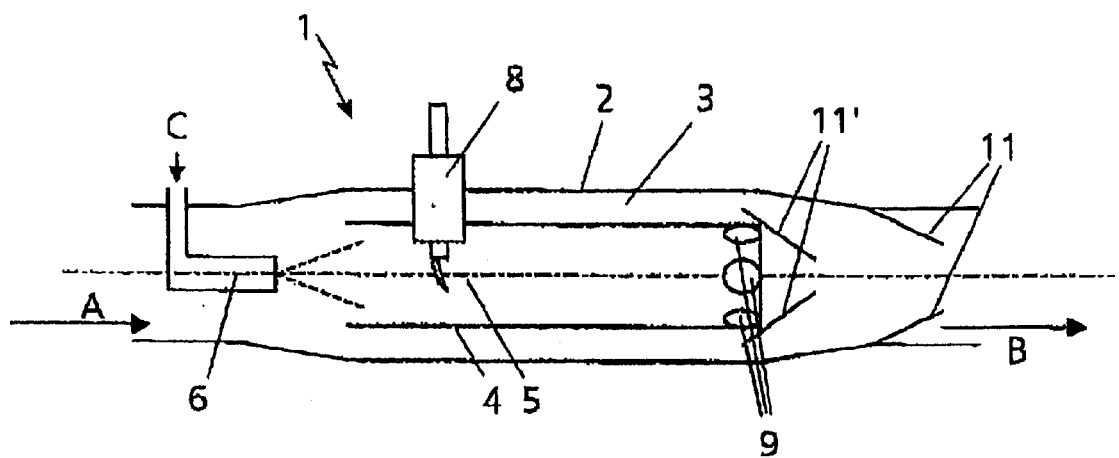
FIG. 8 shows a two-tube burner in an eighth embodiment embodiment according to the present invention.

FIG. 8 represents another embodiment, wherein a clear similarity to FIG. 1 and FIG. 2 can be recognized. In addition to static mixing elements 11, additional static mixing elements 11' are arranged directly in the area of the end 15 of the inner tube element 4, improving the mixing process of the gas stream further.

Figure 9:
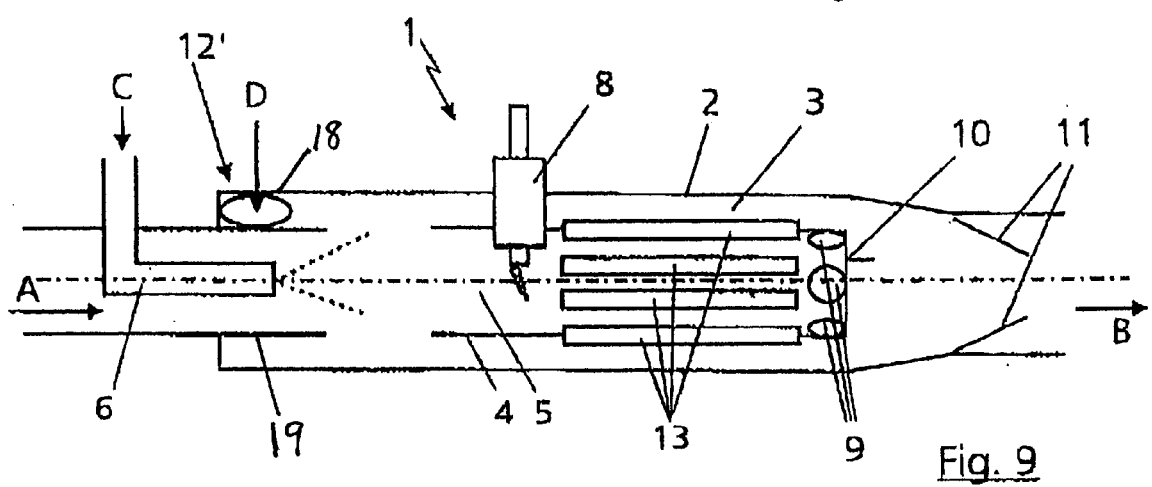
FIG. 9 shows a two-tube burner in a ninth embodiment embodiment according to the present invention.

Another alternative embodiment of the two-tube burner 1 is shown in FIG. 9. The design is basically similar to the design pursuant to FIG. 1. Only the ring nozzle 12 for the additional gas stream D, which pursuant to an embodiment as that shown in FIG. 1 requires much space, takes on a different design in FIG. 9. Accordingly, a device 12' for introducing an additional gas stream D can be seen in FIG. 9. The device 12' consists of a chamber 18 and an inner tube 19 that is arranged in the chamber 18. The gas stream A now flows into the actual two-tube burner 1 via the inner tube 19. By contrast, the additional gas stream D flows into the chamber 18, wherein the flow occurs in a tangential manner. The diameter of the inner tube 19 corresponds at least roughly to the diameter of the tube element 4 of the two-tube burner 1, which forms its interior chamber 5. The tube element 4 and the inner tube 19 however are arranged at a distance from each other so that the gases flowing through the inner tube 19 can reach both the area of the interior chamber 5 and the area of the exterior chamber 3. In the area of the inner tube 19 additionally the fuel C is fed through the nozzles, as already described above.

Since the additional gas stream D flows into the chamber 18 in a tangential manner, the flow is twisted when flowing in so that a marginal flow of the additional gas stream D forms in the chamber. The inner tube 19 serves as a stream guidance device, which supports this marginal flow. Further influence can also be exercised on the flow by expanding or narrowing the inner tube 19 in the area facing the tube element 4, however this is not shown here.

Otherwise, the operation of the two-tube burner 1 is similar to that of the above-described operation, wherein the special design of the device 12' for introducing the additional gas stream D creates a set-up, which with regard to its dimensions is compact and thus can be used in a favorable manner regarding the spatial requirements.

If the additional gas stream D is an inert exhaust gas of the fuel cell, the marginal flow furthermore prevents this gas from reaching the area of the interior chamber, where the combustion is supposed to take place. The combustion process is therefore not influenced by a mixing of the two gases, and no situations can occur where due to the high inert gas percentage no ignitable mixture is available in the area of the interior chamber 5.

Figure 10:
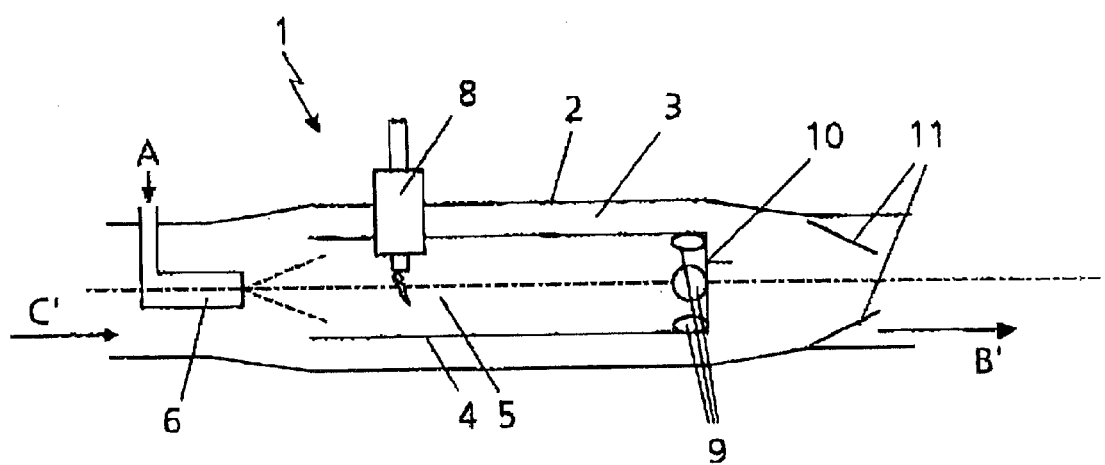
FIG. 10 shows a two-tube burner pursuant to FIG. 2 in an alternative operating method.

FIG. 10 shows an embodiment of the two-tube burner 1, which is basically comparable to the embodiment pursuant to FIG. 2. Only the operating method of the two-tube burner 1 pursuant to FIG. 10 differs from that of the two-tube burner pursuant to FIG. 2.

In order to heat the subsequently arranged catalytic reactor 7, which is not shown in FIG. 10, as quickly as possible, flame combustion is also used in this instance. The embodiment shown here, however, involves a reformate or educt stream C' as the gas stream flowing through the two-tube burner 1. This gas stream, which is low on oxygen, can contain for example reformate that was generated in the gas generating system in a previous operating cycle and then stored in a storage unit and/or the gas stream C' can contain educts, which are provided for the transformation in the subsequent part of the gas generating system, e.g. vapor-enhancing methanol or similar. The gas stream C' thus contains at least a portion of fuel, but is not so low on oxygen that no ignitable mixture can be achieved.

Therefore, in this option of the operating method, an oxygen-containing medium, particularly air A, is fed via the atomizer 6, which in this case is designed as a lance or similar. An ignitable mixture, which can be ignited with the ignition device 8 (e.g., a spark plug or glow plug located in the interior chamber 5), of air A and the reformate or educt stream C' is thus created in the area of the interior chamber 5. By dividing the area into an interior chamber 5 and exterior chamber 3, the flow speed is reduced in the area of the interior chamber 5 so that a stable flame can form in the interior chamber 5. The combustion process in the interior chamber 5 can take place in a substoichiometric or superstoichiometric manner. The quantity of oxygen or air A that is required can be metered accordingly via the atomizer 6 or the lance.

By mixing the flame or its exhaust gases with the part of the gas stream flowing through the exterior chamber 3, the two gas streams are mixed with each other so that a moderate entry temperature can be achieved for the catalytic reactor 7, which in general is clearly below the exhaust gas temperature of the open flame.

Due to the cold portion of the gas stream flowing around the hot tube element 4, which surrounds the interior chamber 5, the loss of heat of the two-tube burner 1 as such is minimized and heat stress of neighboring components can be restricted, even when the two-tube burner 1 is used in very compact systems.

As already mentioned, the flame can be ignited through an ignition device 8, wherein it can take on the design of a glow plug or a spark plug. When igniting the flame with a spark plug, a system is created that starts without hesitation, while a certain pre-glow time must be allowed to pass when using a glow plug.

Of course all embodiments and measures as they relate to designs as well as methods shown here can be combined, to the extent this is possible, so that the desired characteristics of the two-tube burner 1 can be accomplished with appropriate combinations of cross-sectional expansions 17 and 17', cones 16, cross-sectional contractions 9 and 14, components 13, ring nozzles 12, the devices 12' and similar. Each of the designs of the two-tube burner 1 that can be accomplished can then be operated with each of the possible methods.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for introducing at least one of fuel and thermal energy into a gas stream flowing to a catalytic reactor, comprising:
    flowing a gas stream in part through an exterior chamber and in part through an interior chamber, which is partially open in the flow direction and to which fuel is supplied;
    reuniting the partial flows after flowing through the exterior and the interior chambers;
    feeding the reunited partial flows to a catalytic reactor, wherein in a starting phase of a cold catalytic reactor, fuel is burned in the interior chamber; and further comprising
    metering an additional gas stream into an area of the exterior chamber in the case of a warm catalytic reactor, wherein at least part of the additional gas stream comprises an exhaust gas of a fuel cell.

2. A method pursuant to claim 1, wherein during conventional normal operating modes of a warm catalytic reactor, fuel is vaporized in the interior chamber.

3. A method pursuant to claim 1, wherein during the starting phase, the fuel and the part of the gas stream that flows through the interior chamber form an ignitable mixture, which is ignited with an ignition device.

4. A method pursuant to claim 1, wherein the gas stream comprises air.

5. A method pursuant to claim 1, wherein the method is employed in a fuel cell system having a gas generating system.

6. A method pursuant to claim 1, wherein the fuel is burned at least in part in a flame combustion process.

7. A method pursuant to claim 1, wherein fuels that are contained in the additional gas stream are burned catalytically in an area of the exterior chamber.

8. A method pursuant to claim 1, wherein the fuel is introduced via an atomizer into the area where the gas streams flows into the interior chamber.

9. A method for introducing thermal energy into a gas stream that flows to a catalytic reactor, comprising:
    flowing a gas stream in part through an exterior chamber, and in part through an interior chamber, which is at least partially open in the flow direction and to which an oxygen-containing medium is supplied;
    reuniting the partial flows after flowing through the exterior and the interior chambers;
    feeding the reunited partial flows to a catalytic reactor,
    wherein in a starting phase of a cold catalytic reactor fuel that is contained in the gas stream is burned in the interior chamber with the metered oxygen-containing medium; and
    wherein the method is employed for a fuel cell system having a gas generating system.

10. A method pursuant to claim 9, wherein during the starting phase, the oxygen-containing medium and the part of the gas stream that flows through the interior chamber form an ignitable mixture, which is ignited with an ignition device.

11. A method pursuant to claim 9, wherein the oxygen-containing medium comprises air.

12. A method pursuant to claim 9, wherein at least part of the gas stream comprises educts that are fed to the gas generating system for generating the hydrogen-containing gas.

13. A method pursuant to claim 9, wherein the at least part of the gas stream comprises a reformate from a previous operation of the gas generating system.

14. A device for introducing at least one of fuel and thermal energy into a gas stream flowing to a catalytic reactor, comprising an exterior chamber and an interior chamber designed as two tube elements that are inserted into each other, wherein the interior chamber exhibits a cross-sectional contraction in an area where a gas stream flows into the interior chamber.

15. A device pursuant to claim 14, further comprising a static mixing element arranged in a flow direction behind the interior chamber.

16. The device of claim 14, further comprising an ignition device positioned to ignite an ignitable mixture in the interior chamber.

17. The device of claim 14, further comprising an atomizer positioned to introduce fuel into an area where the gas stream flows into the interior chamber.

18. A method for introducing at least one of fuel and thermal energy into a gas stream flowing to a catalytic reactor, comprising:

flowing a gas stream in part through an exterior chamber and in part through an interior chamber, which is partially open in the flow direction and to which fuel is supplied;

reuniting the partial flows after flowing through the exterior and the interior chambers;

feeding the reunited partial flows to a catalytic reactor, wherein in a starting phase of a cold catalytic reactor, fuel is burned in the interior chamber; and wherein during conventional normal operating modes of a warm catalytic reactor, fuel is vaporized in the interior chamber.

19. The method of claim 18, wherein during the starting phase, the fuel and the part of the gas stream that flows through the interior chamber form an ignitable mixture, which is ignited with an ignition device.

20. The method of claim 18, wherein the gas stream comprises air.

21. The method of claim 18, wherein the fuel is burned at least in part in a flame combustion process.

22. The method of claim 18, further comprising metering an additional gas stream into an area of the exterior chamber in the case of a warm catalytic reactor, wherein at least part of the additional gas stream comprises an exhaust gas of a fuel cell.

23. The method of claim 18, further comprising metering an additional gas stream into an area of the exterior chamber in the case of a warm catalytic reactor, wherein fuels that are contained in the additional gas stream are burned catalytically in an area of the exterior chamber.

24. A method for introducing at least one of fuel and thermal energy into a gas stream flowing to a catalytic reactor, comprising:

flowing a gas stream in part through an exterior chamber and in part through an interior chamber, which is partially open in the flow direction and to which fuel is supplied;

reuniting the partial flows after flowing through the exterior and the interior chambers;

feeding the reunited partial flows to a catalytic reactor, wherein in a starting phase of a cold catalytic reactor, fuel is burned in the interior chamber; and wherein the method is employed in a fuel cell system having a gas generating system.

* * * * *